(12) United States Patent
Capron

(10) Patent No.: US 12,049,294 B2
(45) Date of Patent: Jul. 30, 2024

(54) EMERGENCY OPENING DEVICE FOR AN AIRCRAFT DOOR, WITH ROTARY RELEASE

(71) Applicant: LATECOERE, Toulouse Occitaine (FR)

(72) Inventor: Nicolas Capron, Castanet Tolosan Occitanie (FR)

(73) Assignee: LATECOERE, Toulouse Occitanie (FR)

( * ) Notice: Subject to any disclaimer, the term of this patent is extended or adjusted under 35 U.S.C. 154(b) by 540 days.

(21) Appl. No.: 17/291,444

(22) PCT Filed: Nov. 6, 2019

(86) PCT No.: PCT/EP2019/080332
§ 371 (c)(1),
(2) Date: May 5, 2021

(87) PCT Pub. No.: WO2020/094688
PCT Pub. Date: May 14, 2020

(65) Prior Publication Data
US 2022/0003031 A1    Jan. 6, 2022

(30) Foreign Application Priority Data
Nov. 8, 2018 (FR) ...................... 1860285

(51) Int. Cl.
*B64C 1/14*    (2006.01)
*E05F 1/10*    (2006.01)

(52) U.S. Cl.
CPC .............. *B64C 1/1423* (2013.01); *E05F 1/10* (2013.01); *E05Y 2201/474* (2013.01); *E05Y 2800/252* (2013.01); *E05Y 2900/502* (2013.01)

(58) Field of Classification Search
CPC ........ B64C 1/1423; E05F 1/10; E05F 1/1008; E05F 1/1025; B64D 25/00
See application file for complete search history.

(56) References Cited

U.S. PATENT DOCUMENTS

| 5,031,863 | A | * | 7/1991 | Noble | .................. | B64C 1/1407 |
|---|---|---|---|---|---|---|
| | | | | | | D12/345 |
| 2009/0300881 | A1 | * | 12/2009 | Lin | .......................... | E05D 5/12 |
| | | | | | | 16/303 |
| 2014/0084600 | A1 | * | 3/2014 | Lamat | ................... | B64C 1/1423 |
| | | | | | | 292/92 |
| 2017/0267327 | A1 | * | 9/2017 | Herau | ................... | F16D 63/006 |

(Continued)

FOREIGN PATENT DOCUMENTS

| CA | 2960522 | A1 * | 9/2017 | ............... B64C 1/14 |
|---|---|---|---|---|
| EP | 3323709 | | 5/2018 | |

(Continued)

*Primary Examiner* — Marcus Menezes
(74) *Attorney, Agent, or Firm* — Defillo & Associates, Inc.; Evelyn A. Defillo

(57) ABSTRACT

An emergency opening device (1) for an aircraft door having: a tubular operating member (2); elastic compression device (3). The operating member (2) includes a first end element (10) and a second end element (11) that can move in translation with respect to one another. The first end element (10) having a cylindrical retractable rotary stop (20), that can move between a first angular position of transmission and a second angular position of release.

14 Claims, 6 Drawing Sheets

(56) References Cited

U.S. PATENT DOCUMENTS

| | | | |
|---|---|---|---|
| 2021/0261233 A1* | 8/2021 | Molinari | B64C 1/1407 |
| 2021/0348431 A1* | 11/2021 | Capron | B64C 1/1423 |
| 2022/0003032 A1* | 1/2022 | Capron | E05F 1/10 |

FOREIGN PATENT DOCUMENTS

| | | |
|---|---|---|
| FR | 2319758 | 2/1977 |
| FR | 2975967 | 12/2012 |
| FR | 3040721 | 3/2017 |

\* cited by examiner

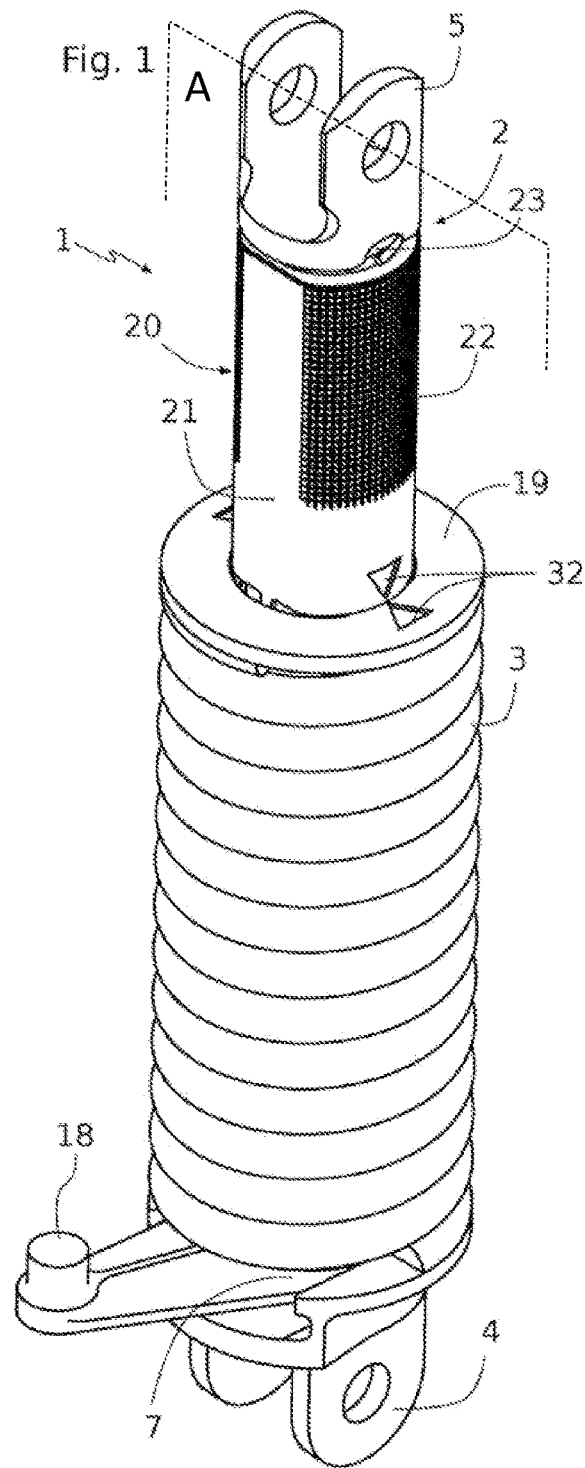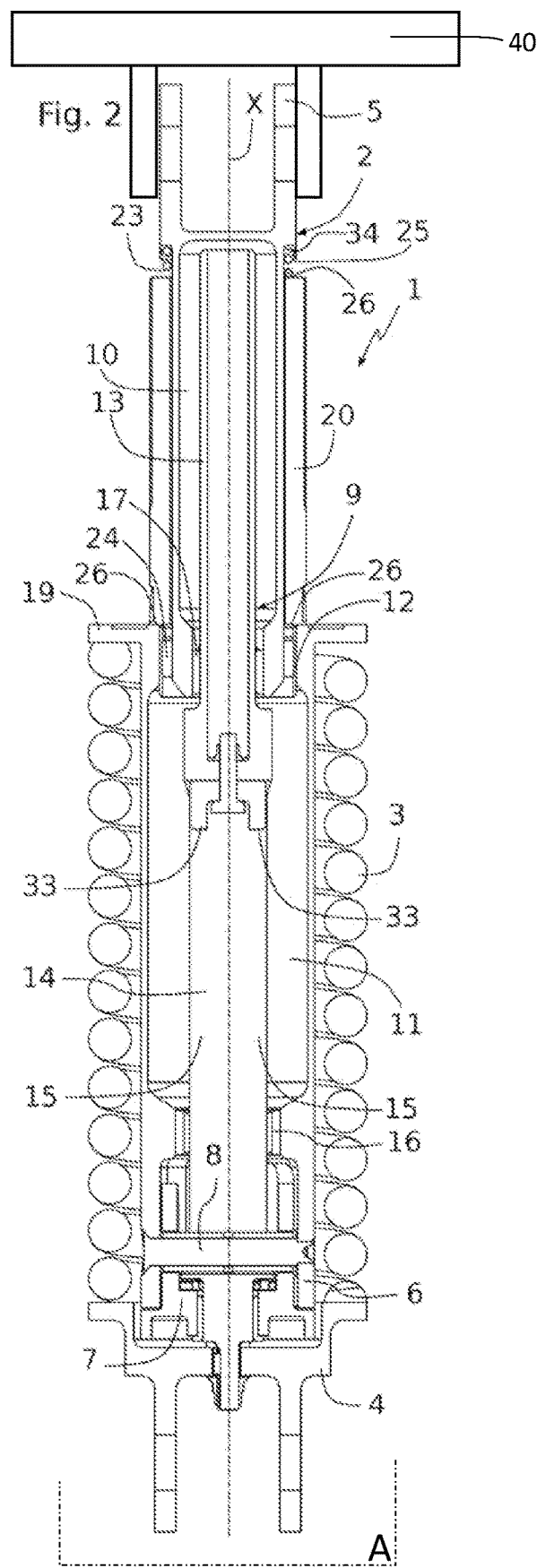

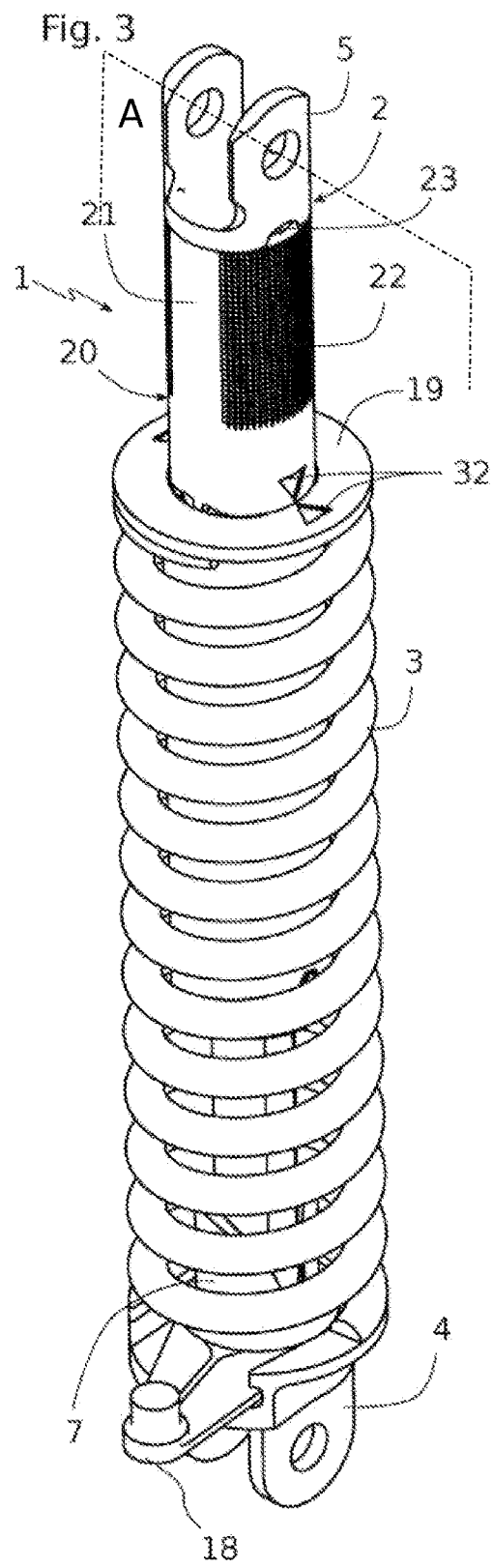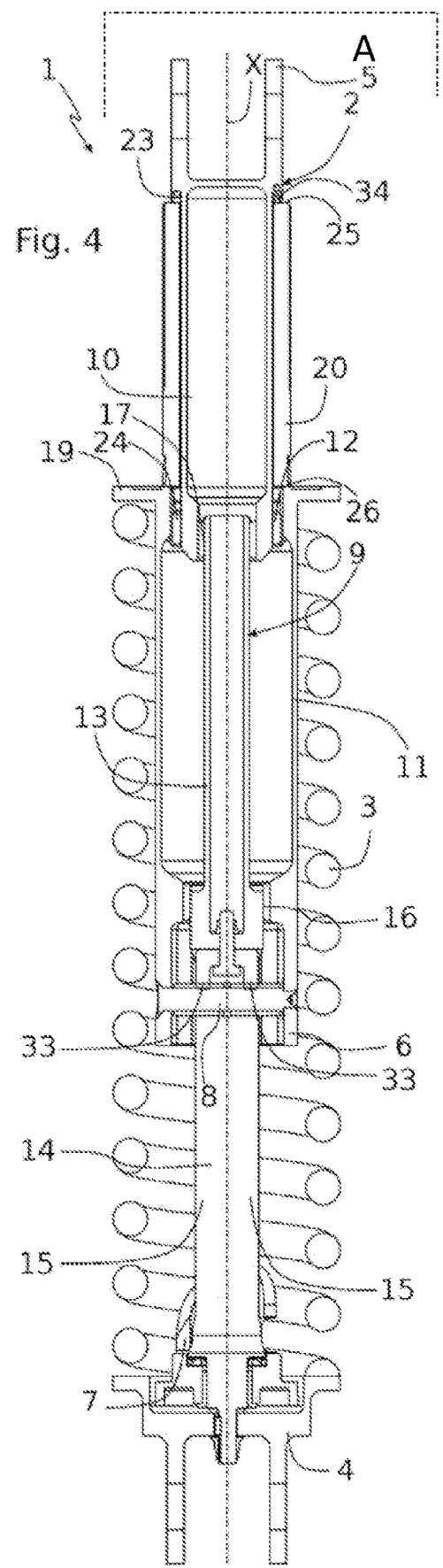

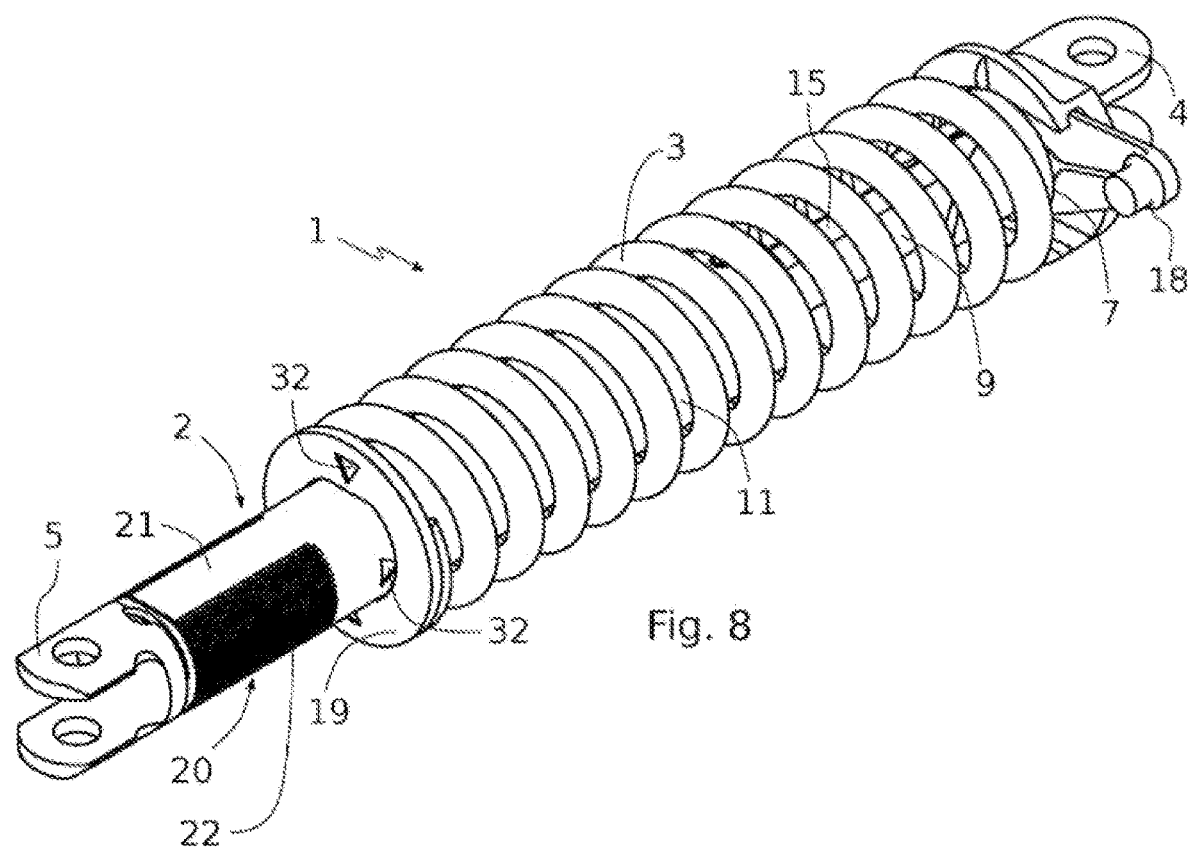
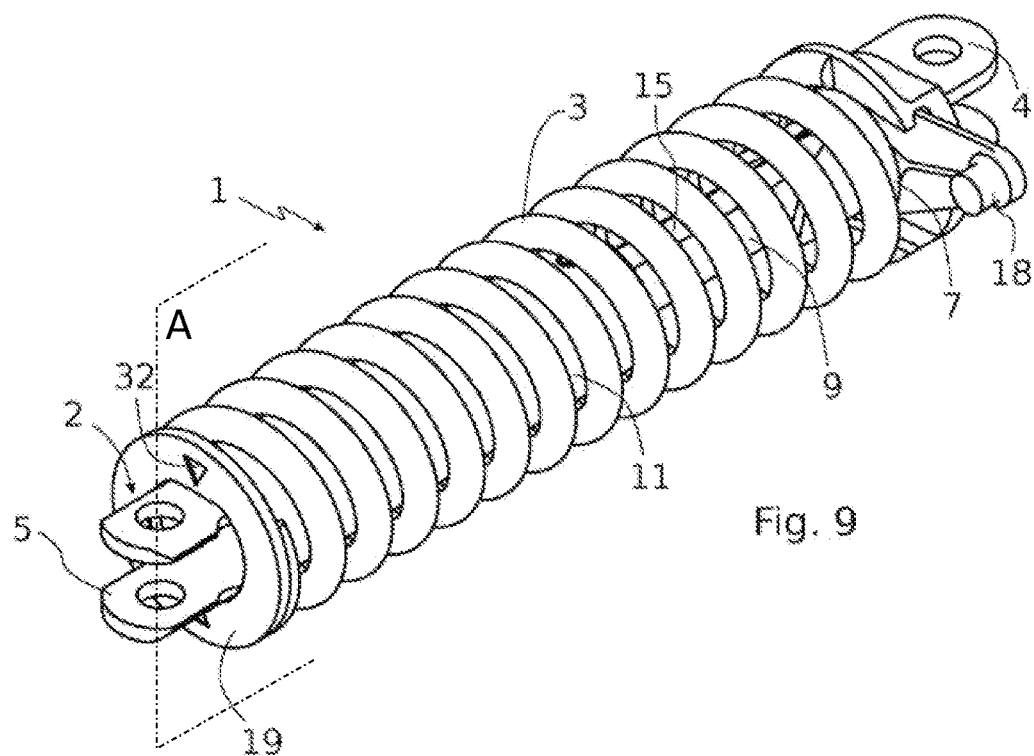

EMERGENCY OPENING DEVICE FOR AN AIRCRAFT DOOR, WITH ROTARY RELEASE

CROSS REFERENCE TO RELATED APPLICATION

This application is a national stage entry of PCT/EP2019/080332 filed Nov. 6, 2019, under the International Convention and claiming priority over French Patent Application No. 1860285 filed Nov. 8, 2018.

TECHNICAL FIELD

The invention relates to the field of aeronautics and deals with an emergency opening device for an aircraft door provided with an opening mechanism.

Aircraft doors are provided with an opening mechanism to allow passengers to exit and enter or to allow evacuation in case of emergency. In the event of emergency evacuation of the passengers, the aircraft doors, whether they are passenger doors or emergency evacuation doors, usually comprise an emergency opening device which, if activated, provokes a rapid and automatic opening of the doors, without requiring human intervention other than the activation thereof.

Such emergency opening devices conventionally comprise means for actuating the door opening mechanism, that can be switched between a passive state and an active state provoking the opening of the door, and means for activating the actuation means allowing a user to trigger the emergency opening.

PRIOR ART

The patent application FR2975967 describes an aircraft emergency opening device which consists of actuation means of essentially mechanical design implementing elastic compression means and making it possible to dispense with pneumatic, hydraulic or pyrotechnic elements. The emergency opening device described also fulfils a service opening function allowing the door to be opened and closed in normal operation, that is to say outside of emergency opening phases. After an emergency opening phase, the aircraft door can be reclosed by rearming the emergency opening device using a tool by which a threaded rod is screwed, provoking the compression of the elastic compression means.

SUMMARY OF THE INVENTION

The aim of the invention is to improve the aircraft door emergency opening devices of the prior art.

To this end, the invention targets an emergency opening device for an aircraft door provided with an opening mechanism, comprising:
  means for actuating the opening mechanism, that can be switched between a passive state and an active state of activation of the opening mechanism, and comprising:
    a tubular operating member provided with a first end linking with the door, and a locking second end; elastic compression means disposed between a fixed stop element and the operating member; a member for retaining the locking second end, that can move between a closed position of locking of the locking second end, in a position of the operating member corresponding to the passive state of the actuation means in which the elastic means are kept compressed, and an open position of release of the locking second end allowing the displacement of the operating member on an axis of displacement to a position corresponding to the active state of the actuation means, under the effect of the effort resulting from the expansion of the elastic means;
  means for activating the actuation means designed to drive the opening of the retaining member.

In this device:
  the operating member comprises a first end element and a second end element that can move in translation with respect to one another on the axis of displacement, the first end of the operating member being situated on the first end element and the locking second end of the operating member being situated on the second end element;
  the first end element comprises a cylindrical retractable rotary stop, that can move between: a first angular position of transmission in which the rotary stop has a driving surface facing the second end element, the second end element then being adapted to drive the first end element in translation on the axis of displacement, upon the activation of the actuation means; and a second angular position of release in which the rotary stop has a section contained within the outline of a release opening formed in the second end element, the first end element then being free to slide in translation on the axis of displacement with respect to the second end element.

In the present description and the claims, the expression "link with the door" is understood with respect to the aircraft door in the broad sense. The aircraft door in the broad sense includes the door opening, the door opening mechanism, or even the structure framing the door and linked to the fuselage (corresponding to the architrave of the door). Thus, the first end of the actuation member is linked to an element of the door (opening, opening mechanism, or architrave structure) and the fixed stop element is linked to another element of the door (opening, opening mechanism, or architrave structure) such that the expansion of the elastic means provokes the actuation of the door opening mechanism, and the actual opening of the door. For example, the first end of the actuation member can be fixed to the door opening mechanism, and the fixed stop element can be fixed onto the door opening. As another example, the first end of the actuation member can be fixed onto the door opening, and the fixed stop element can be fixed onto the door architrave structure.

Such an emergency opening device offers all the advantages of a mechanical device as described in the document FR2975967. The mechanical design of the actuation means does not require any particular maintenance in the absence of use of the opening device. The use of the opening device does not mean having to replace a trigger member, as with the pneumatic or pyrotechnic devices. No driving medium is needed to activate the actuation means.

The emergency opening device according to the invention also has a reduced weight and bulk. All the functions linked to the triggering of the emergency opening and to the service opening are grouped together about one and the same axis of displacement of the actuation member. Such a device forms a finished product of mechanical cylinder type that is entirely autonomous, which is a guarantee of reliability and of dependability that are appreciable qualities in the field of aeronautics and more particularly emergency opening devices. In addition to the weight saving, which is a critical characteristic in aeronautics, the compactness of the device allows it to be installed in complex aircraft doors, comprising numerous devices such as safety devices, portholes, viewing devices, various assistance devices, esthetic cowlings, etc.

The service opening function is fulfilled by particularly compact means forming part of the operating member. The arrangement of the operating member, which is composed of a first end element and of a second end element, allows this service opening function to be implemented when the emergency opening device is in the passive state, that is to say during the normal operation of the aircraft door. The aircraft door can thus be opened and closed in the conventional manner to allow the embarkation and debarkation of the passengers and the locking of the door during the flight of the aircraft. Furthermore, the means allowing this service opening are, here, exploited to fulfil an additional function of release of the emergency opening device. In fact, in an emergency opening case, the actuation means of the opening mechanism are switched to their active state which drives the rapid opening of the door under the effect of the elastic compression means. Following this emergency opening, the door is held in open position under the effect of the ongoing stress from the elastic compression means. The release of the emergency opening device makes it possible to reclose the aircraft door rapidly, without having to rearm the latter, that is to say without having to recompress the elastic compression means. The elastic compression means, provided for a rapid opening of the aircraft door, have a strong rating which makes the rearming of the emergency opening device lengthy and difficult.

The release of the emergency opening device makes it possible, for example, during maintenance operations, to test the emergency device by activating it and by nevertheless being able subsequently to easily and rapidly reclose the aircraft door by the action of a single operator. Furthermore, in an emergency opening case, it may be that the crew member who activated the emergency opening device observes, after the rapid opening of the door, that the latter has opened onto a dangerous environment. In this case, the release of the emergency opening device allows this crew member to immediately reclose the door by acting directly on the rotary stop and by manually reclosing the door. In these conditions, the aircraft door can be operated to open and close normally even through the emergency opening device has been triggered. That not only allows the emergency closure of the aircraft door as described previously, but also allows the aircraft to take off again until a next maintenance operation in which the emergency opening device will be rearmed.

Although the emergency opening device incorporates these additional services opening and release functions, it remains entirely mechanical, guaranteeing operation independent of any energy source, as well as enhanced reliability.

The emergency opening device can comprise the following additional features, alone or in combination:
- the rotary stop is mounted to rotate about the axis of displacement;
- the rotary stop is mounted to slip along the axis;
- the section of the rotary stop exhibits a dissymmetry of revolution;
- the release opening of the second end element has a section fitted to the section of the rotary stop;
- the rotary stop is formed by a sleeve whose inner surface is a circular-base cylinder and whose outer surface is a cylinder comprising at least one flat, this sleeve being mounted by a pivot link slipping over a portion of the first end element which has a circular-based cylindrical outer surface, the driving surface being composed of the edge of this sleeve;
- the release opening of the second end element comprises at least one flat on its inner surface, the flat of the rotary stop being in line with the flat of the second end element when the rotary stop is in its second angular position of release;
- the release opening of the second end element comprises, on its inner surface, a guiding portion of the first end element;
- the device comprises a rotation stop ring fixed onto the first end element, the rotary stop and the rotation stop ring being able to be secured in rotation by teeth inserted into notches;
- the first end element comprises a spring stressing the rotary stop against the rotation stop ring;
- the spring is disposed in a groove into which all of the spring can return;
- the first end element comprises a surface for stopping translation on the axis of displacement of the rotary stop, this stop surface being disposed in line with the rotary stop, opposite the driving surface;
- the second end element comprises a bearing flange for the elastic compression means, this flange being disposed around the release opening of the second end element;
- the device comprises a sliding cylinder coaxial with the axis of displacement, the first end element and the second end element being mounted to slide over this sliding cylinder;
- the sliding cylinder comprises a travel end stop for the operating member;
- the first end element and the second end element are each mounted on the sliding cylinder by a friction ring;
- the sliding cylinder comprises a first portion and a second portion of different sections, the first end element being mounted to slide on the first portion and the second end element being mounted on the second portion;
- the sliding cylinder is fixed to the fixed stop element;
- the retaining member is mounted to rotate on the sliding cylinder;
- the travel end stop is produced by a groove formed in the sliding cylinder, into which there is inserted an axial retaining finger secured to the second end of the operating member.

DESCRIPTION OF THE FIGURES

Other features and advantages of the invention will emerge from the description given of it hereinbelow, in an indicative and nonlimiting manner, with reference to the attached drawings, in which:

FIG. 1 represents a perspective view of an emergency opening device of an aircraft door, according to the invention, in its passive state;

FIG. 2 is a cross-sectional view taken along line A of FIG. 1;

FIG. 3 represents a perspective view of the device of FIG. 1 in its active state;

FIG. 4 is a cross-sectional view taken along line A of FIG. 3;

FIG. 8 represents a perspective view of the device of FIG. 3 and illustrates the operation of the rotary stop in order to switch to released mode;

FIG. 9 represents the device of FIG. 7 in released mode;

DETAILED DESCRIPTION

Figure 5:
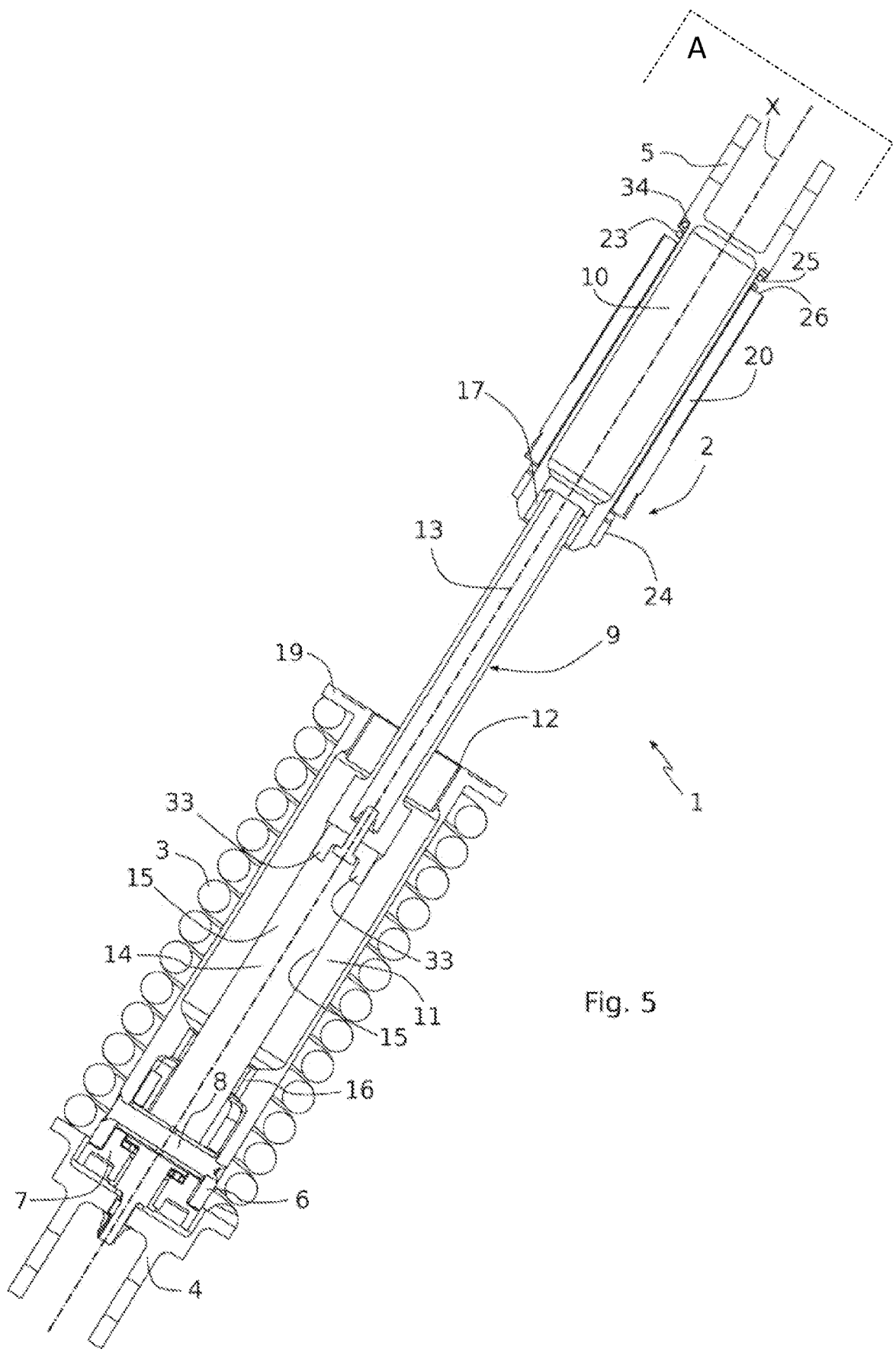
FIG. 5 is a cross-sectional view taken along line A of the device of FIG. 1 illustrating the service opening function.

FIGS. 1 and 2 represent an emergency opening device 1 according to the invention in its passive state. This device 1 takes the form of a compact actuator designed to provoke the emergency opening of an aircraft door provided with an opening mechanism. Aircraft doors are generally provided with an opening mechanism comprising, for example, systems of hinges and of support arms allowing the aircraft door to be movable between a closed position and an open position. This opening mechanism is used for a manual or motorized opening of the aircraft door for normal passenger embarkation and debarkation operations. The device 1 allows the automatic emergency opening of the aircraft door. To that end, the device 1 comprises means for actuating the aircraft door opening mechanism, these actuation means comprising a tubular operating member 2 and elastic compression means which are, in the present example, composed of a spring 3 of sufficient rating to provoke the rapid opening of the aircraft door in an emergency situation.

The operating member 2 is provided with a first end 5 linking with the door 40 and the spring 3 is disposed between a fixed stop element 4 and the operating member 2. The spring 3, in the active state of the device 1, provokes a separation between the fixed stop element 4 and the first end 5 of the operating member. Thus, the device 1 can be mounted in the aircraft door opening mechanism, by a first fixing at the first end 5 of the operating member 2 and by a second fixing at the fixed stop element 4 in an arrangement in which the separation between these two fixings provokes the opening of the door 40.

The operating member 2 further comprises a so-called locking second end. This second end 6 is designed to cooperate with a retaining member here composed of a rotary hook 7 for holding the device in its passive state, ready to be activated, the spring 3 being compressed. The second end 6 of the operating member 2 comprises an axial retaining finger 8 fixed transversely to the second end 6 and the rotary hook 7 is designed to retain this finger 8 when the device 1 is in its passive state. The rotary hook 7 thus retains the operating member 2 by keeping the spring 3 compressed.

The rotary hook 7 is associated with a lever 18 which, when it is actuated in order to obtain the emergency opening, drives the rotation of the hook 7 and the releasing of the finger 8 then allowing the expansion of the spring 3 and consequently the switching of the device 1 to its active position.

The device 1 comprises a sliding cylinder 9 fixed onto the fixed stop element 4 and constituting an axis allowing the operating member 2 to slide with respect to the fixed stop element 4, on an axis of displacement X.

The operating member 2 is, here, produced in two parts: a first end element 10 on which the first end 5 is situated, and a second end element 11 on which the second end 6 is situated.

The sliding cylinder 9 comprises a first tubular portion 13 and a second tubular portion 14. In the present example, the second portion 14 has a greater diameter than the first portion 13. The second portion 14 has a groove 15 passing right through it in which the finger 8 is engaged.

The sliding of the operating member 2 over the sliding cylinder 9 is ensured on the one hand by a friction ring 16 guiding the sliding of the second end element 11 over the second portion 14, and, on the other hand, by a friction ring 17 guiding the sliding of the first end element 10 over the first portion 13. The rotary hook 7 is also mounted to rotate on the sliding cylinder 9.

The second end element 11 comprises, at its end opposite the second end 6, a bearing flange 19 for the spring 3. In FIGS. 1 and 2, the spring is therefore compressed between the flange 19 and the fixed stop element 4.

The first end element 10 comprises a rotary stop 20 which is retractable and which has a cylindrical form. Any form exhibiting a dissymmetry of revolution can be used to form the base of the cylinder which is composed of the rotary stop. In fact, the rotary stop 20 can be dissymmetrical to be able to occupy two angular positions, a first angular position of transmission in which the rotary stop 20 here has two driving surfaces 26 in line with the second end element 11, and a second angular position of release in which the rotary stop 20 has a section enclosed within the outline of a release opening formed in the second end element 11, at the flange 20.

In the present example, the base of the cylinder which is composed of the rotary stop 20 is a circle flattened on either side of a diameter which generates a cylinder comprising two opposite flats 21. The portions of the rotary stop 20 which are outside of the flats 21 comprise a knurling 22, or any other coating, facilitating the gripping thereof with a view to the rotation thereof. The driving surfaces 26 are composed of the edge of the rotary stop 20, at its portions which are outside of the flats 21.

The rotary stop 20 is mounted to rotate on the first end element 10 and a spring 23 disposed between the first end element 10 and the rotary stop 20 stresses the latter against a rotation stop ring 24 which is fixed to the first end element 10, opposite the spring 23.

The rotary stop 20 is thus formed by a sleeve whose inner surface is a circular-based cylinder and whose outer surface is a cylinder comprising at least one flat, this sleeve being mounted by a pivot link slipping over the first end element 10, the driving surfaces 26 being composed of the edge of this sleeve. On its portion receiving the rotary stop 20 as pivot link, the first end element 10 has a circular-based cylindrical outer surface.

On the side of the spring 23, the first end element 10 comprises a stop surface 25 designed to stop translation of the rotary stop 20.

The rotary stop 20 can thus move in translation on the axis of displacement X with respect to the first end element 10 within the limits imposed by, on one side, the stop surface 25 and, on the other side, by the ring 24.

In the configuration of FIGS. 1 and 2, the rotary stop 20 is in its first angular position of transmission in which the rotary stop 20 has the two stop surfaces 26 in line with the flange 19 of the second end element 11. In this configuration, the second end element 11 is designed to drive the first end element 10 in translation on the axis of displacement X by virtue of the rotary stop 20. Indeed, upon the operation of the lever 18 by a user in order to trigger the emergency opening, the rotary hook 7 releases the finger 8 and allows the expansion of the spring 3. Under the load of the spring 3, on the flange 19, the second end element 11 is translated on the axis of displacement X. The second end element 11 drives the rotary stop 20 with it in translation by virtue of the driving surfaces 26. The rotary stop 20 is then translated on the axis X by slipping over the first end element 10 until the rotary stop 20 comes into abutment against the stop surface 25. During the joint translation of the second end element 11 and of the rotary stop 20 until the latter makes contact with the stop surface 25, the first end element 10 remains fixed and the second end element 11 slides over the first end element 10 at a slide fit 12.

The spring 23 is housed in a groove 34 in which all of it is housed when the rotary stop 20 enters into contact with the stop surface 25.

When the rotary stop 20 is against the stop surface 25, the rotary stop 20 continues its translation of axis X, under the load of the spring 3, by in turn driving the first end element 10 in translation of axis X. The force allowing the emergency opening of the aircraft door 40 is thus transmitted from the spring 3 to the flange 19, then to the rotary stop 20 by the driving surfaces 26, and to the first end element 5 by the stop surface 25.

Activation of the device 1 then leads to the position of FIGS. 3 and 4 corresponding to the total opening of the aircraft door 40. This position has been reached by virtue of the pressure of the flange 19 on the rotary stop 20 and of the rotary stop 20 on the first end element 10. However, at end of travel, as represented in FIGS. 3 and 4, the axial retaining finger 8 comes into abutment against the end 33 of the groove 15. This end 33 of the groove 15 constitutes an end-of-travel stop for the expansion movement of the spring 3.

According to a preferred feature, the operating member 2 thus comprises an end-of-travel stop 33 limiting its displacement under the effect of the thrust of the spring 3, which releases the pressure on the rotary stop at the end of activation of the device to facilitate the switching of the rotary stop from its angular position of transmission to its angular position of release.

In the end-of-travel position of FIGS. 3 and 4, the spring 3 is contained between the flange 19 and the fixed stop element 4 by virtue of the finger 8 being held against the end 33 of the groove 15. The spring 3 therefore no longer exerts pressure on the rotary stop 20. Since the operating member 2 is in abutment on the end of the groove 15, a play allowing the rotation of the rotary stop 20 is permitted, with a view to release. Indeed, the dimensions of the operating member 2, notably the distance between the finger 8 and the flange 19, are chosen so that the rotary stop 20 is held away from the rotation stop ring 24 when the device 1 is in its end-of-travel position, thus freeing the rotation of the rotary stop 20. In other words, at the end of activation, the device 1 automatically switches to a configuration allowing the release.

The switching of the device 1 from its passive state of FIGS. 1 and 2 to its activated state of FIGS. 3 and 4 illustrates the operation of the device 1 when it is triggered for an emergency opening of the aircraft door.

FIG. 5 illustrates an additional function of the device 1 according to which the device 1 fulfils a service opening function. According to this service opening function, the first end element 10 slides freely along the first portion 13 of the sliding cylinder 9 while the second end element 11 is held in place by the rotary hook 7. During this sliding allowing the service opening function, the elements 10, 11 can be nested together and taken apart in the zone 12.

This possibility of sliding of the first end element 10 allows the opening and the closing of the door in the normal conditions of operation, without the device 1 being triggered.

The device 1 further fulfils another, so-called release function, allowing, when the device 1 is in its end-of-travel position of FIGS. 3 and 4 following the triggering of the emergency opening of the door, the aircraft door to be immediately reclosed.

Figure 6:
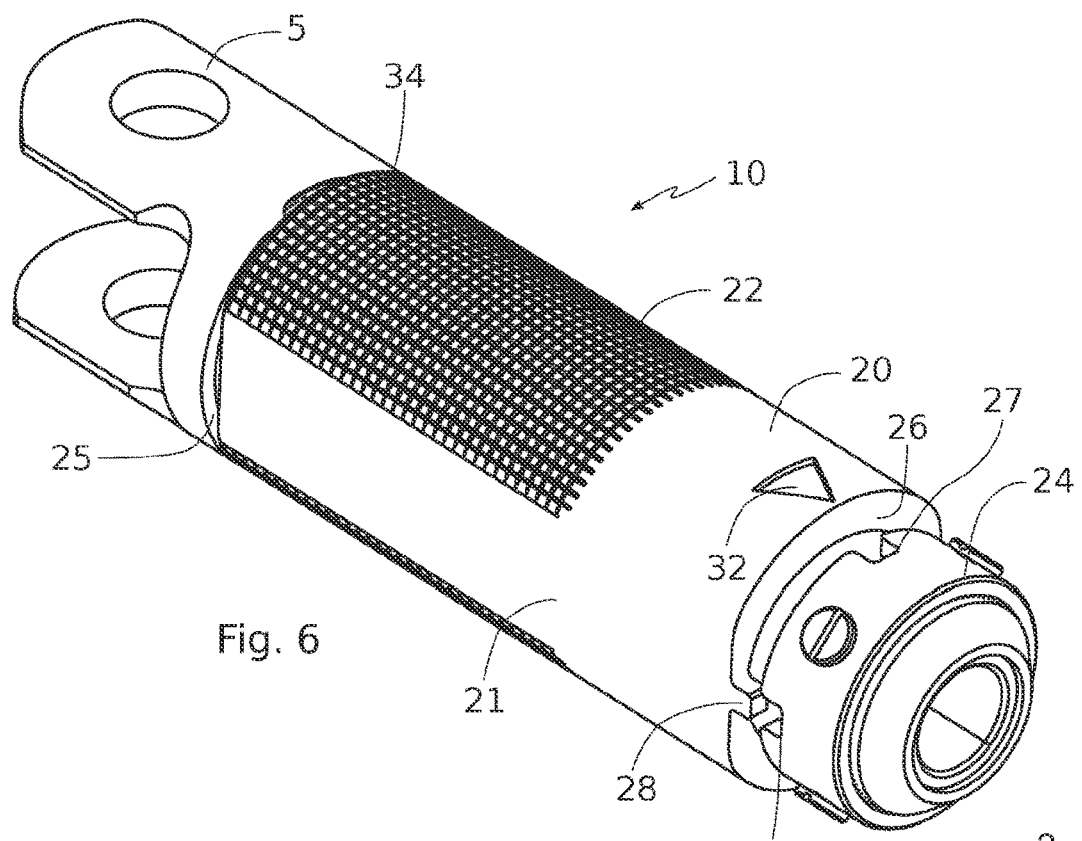
FIG. 6 represents a perspective view of the rotary stop of the device of FIGS. 1 to 5.
Figure 7:
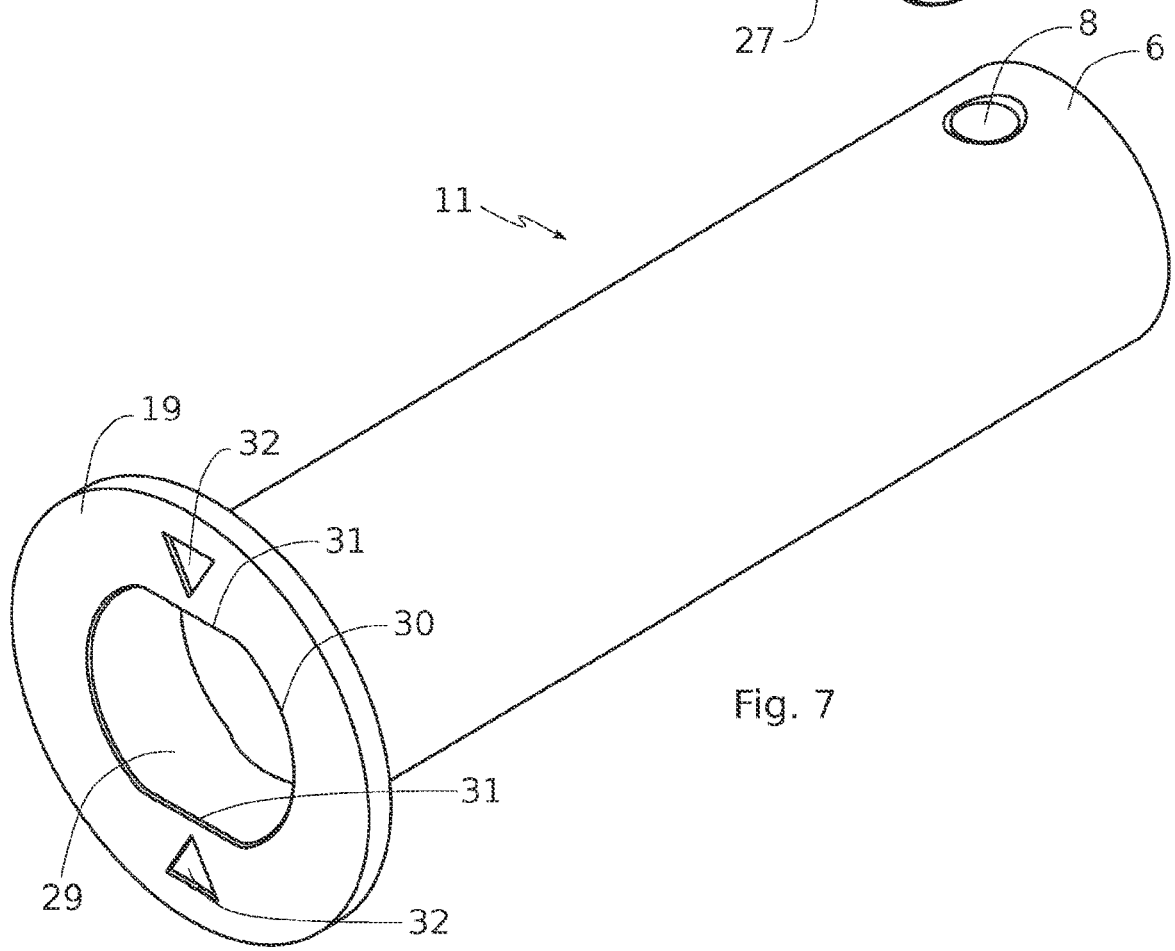
FIG. 7 represents a perspective view of the second end element of the operating member of the device of FIGS. 1 to 5.

FIGS. 6 and 7 respectively represent the first end element 10 and the second end element 11 separated.

Referring to FIG. 6, the rotation stop ring 24 is fixed by any means onto the first end element 10, for example by screwing. This ring 24 comprises, in the present example, four notches 27 evenly distributed over its circumference, on either side of two right-angled diameters. The rotary stop 20, for its part, comprises two diametrically opposing teeth 28. The stressing of the rotary stop 20 against the rotation stop ring 24 under the load of the spring 23 allows the rotary stop 20 to occupy at least two stable angular positions: the angular position of transmission illustrated in FIG. 6 in which the teeth 28 are each engaged in a notch 27, and another angular position of release in which the rotary stop 20 has been turned by a quarter-turn about the axis X, with respect to the first end element 10, the two teeth 28 then engaging in the other two notches 27 of the rotation stop ring.

The spring 23 allows the rotary stop 20 to remain in a stable angular position during the service opening function. In fact, the aircraft door can be opened and reclosed within the context of the service opening function, the device 1 therefore being in its passive state, while the rotary stop 20 remains angularly fixed by nesting of the teeth 28 in the corresponding notches 27, under the load of the spring 23. The rotary stop 20 cannot therefore be in an out-of-alignment angular position upon the implementation of the service opening function.

FIG. 7 shows the inside of the second end element 11 at the flange 19. The second end element 11 comprises a release opening 30 surrounded by the flange 19. This release opening 30 has a form complementing the form of the cylinder which is composed of the rotary stop 20. The release opening 30 thus has a cylindrical inner surface with flats 31.

When the rotary stop 20 is in its angular position of release, the flats 21 of the rotary stop 20 are aligned with the flats 31 of the release opening 30 such that the rotary stop 20 can slide into the opening 30, freely. In the angular position of release, the section of the rotary stop 20 is contained within the outline of the release opening 30, that is to say that no element of the second end element opposes the sliding of the rotary stop 20 in the release opening 30. The concept of section refers here to a cross section at right angles to the axis of displacement X.

In its angular position of transmission, when the rotary stop 20 is turned by 90 degrees with respect to the angular position of release, the two driving surfaces 26 are positioned in line with the flats 31 of the opening 30. Thus, the rotary stop 20 can no longer slide inside the opening 30 such that the second end element 11 can drive the rotary stop 20 in translation.

The rotary stop 20 and the flange 19 advantageously comprise diametrically opposite arrows 32 indicating, when the arrows of the rotary stop 20 are aligned with the arrows of the flange 19, that the rotary stop 20 is in the angular position of transmission. The aircraft crew can thus visually check that the device 1 is operational for an emergency opening.

FIGS. 8 and 9 illustrate the release function of the emergency opening device. The switching of the device 1 from its activated position at end of travel following an emergency opening (FIG. 3) to a release position in which the closure of the aircraft door is possible despite the activation of the device 1 (FIG. 8) is performed by simple operation of the rotary stop 20.

From the position of FIG. 3, the arrows 32 being aligned, the user pivots the rotary stop 20 by 90 degrees (see FIG. 7 in which the arrows 32 are no longer aligned). The switching of the rotary stop 20 from its angular position of transmission to its angular position of release is performed by the user who:

- pivots the rotary stop 20 by a quarter-turn about the axis X, on the first end element 10, which is permitted by the end-of-travel stop 33 which retains the operating member 2 in a position in which the second end element 11 pushes back the rotary stop 20 away from the rotation stop ring 24, thus freeing the rotation of the rotary stop, then releases the rotary stop 20, the spring 23 then stressing the rotary stop 20 to return against the ring 24, such that the teeth 28 take position in the notches 27 corresponding to this new angular position.

From the position of FIG. 7, the rotary stop 20 can slide freely in the opening 30 such that the aircraft door can be fully reclosed which corresponds to the position of FIG. 9.

Figure 10:
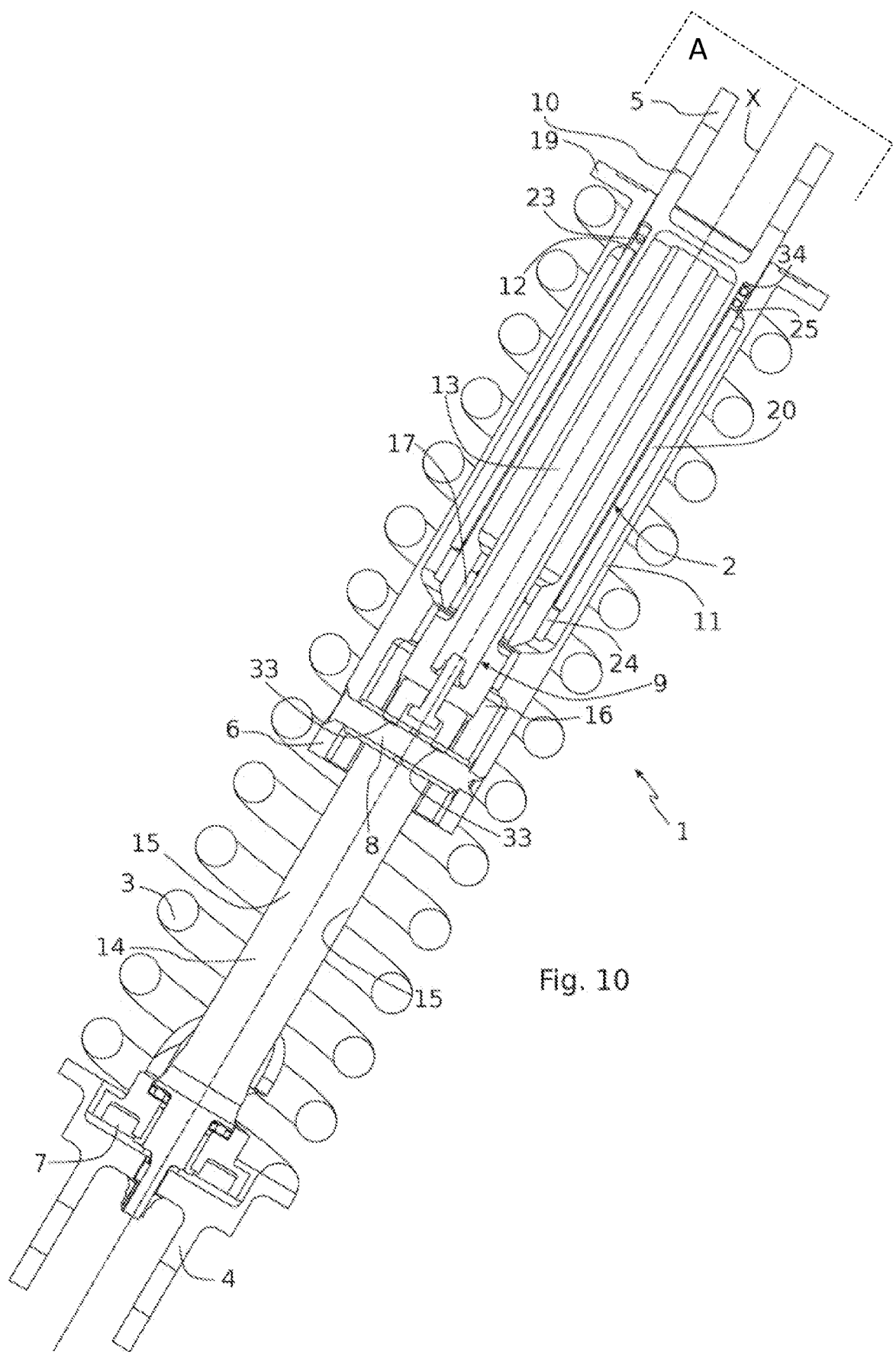
FIG. 10 is a cross-sectional view taken along line A of the device of FIG. 9.

FIG. 10 is a cross-sectional view of the device 1 in its position of FIG. 9. In this position, the first end element 10 has slid along the first portion 13 of the sliding cylinder 9.

The sliding cylinder 9 combines the functions of:

- guiding of the operating member 2 in translation on the axis of displacement X;
- guiding of the first end element 10 in translation with respect to the second end element 11 both in the service opening function and during the releasing of the device 1;
- guiding of the rotary hook 7 in rotation;
- angular holding of the operating member 2 preventing the latter from turning about the axis of displacement X with respect to the fixed stop element 4;
- end-of-travel stop for the operating member 2, the finger 8 coming into abutment against the end 33 of the groove 15 when the device 1 is in its activated state (see FIG. 4).

Variant embodiments of the device 1 can be implemented without departing from the scope of the invention. For example, the locking of the second end 6 of the operating member 2 can be done by any mechanical means. Likewise, the rotary stop 20 can take any other form with a dissymmetry of rotation which allows a first angular position in which at least one driving surface is presented in line with the release opening 30, and one second angular position in which the rotary stop 20 can slide in the release opening. The release opening, for its part, can also take any form capable of containing the section of the rotary stop 20 when it is in its angular position of release, and have a bearing surface for the driving surface 26 when the rotary stop 20 is in its angular position of transmission. Moreover, other pairs of forms and counter-forms, other than the teeth 28 and the notches 27, can be envisaged for keeping the rotary stop 20 in its angular positions.

The invention claimed is:

1. An emergency opening device (1) for an aircraft door provided with an opening mechanism, the emergency opening device comprising:
    an actuating device that switches between a passive state and an active state, the actuating device comprising:
    a tubular operating member (2) provided with a first end (5) linking with the aircraft door and a second end (6);
    an elastic compression device (3) disposed between a fixed stop element (4) and the tubular operating member (2);
    a retaining member (7) connected to the second end (6) of the tubular operating member (2), the retaining member (7) includes a retainer finger (8), the retaining member (7) moves between a closed position in the passive state of the actuating device in which the elastic compression device (3) is kept compressed, and an open position in which the elastic compression device is expanded, releasing the second end (6) and allowing displacement of the tubular operating member (2) to a position corresponding to the active state of the actuating device;
    an activation device (18) for actuating the opening of the retaining member (7); wherein:
    the tubular operating member (2) comprises a first end element (10) and a second end element (11) that move in translation with respect to one another on an axis of displacement (X), the first end (5) of the tubular operating member (2) being situated on the first end element (10) and the second end (6) of the tubular operating member (2) being situated on the second end element (11);
    the first end element (10) comprises a cylindrical retractable rotary stop (20) that moves between: a transmission position in which the cylindrical retractable rotary stop (20) has a driving surface (26) facing the second end element (11), the second end element (11) then being designed to drive the first end element (10) in translation on the axis of displacement (X), upon the activation of the actuating device; and a release position in which the cylindrical retractable rotary stop (20) has a section contained within the outline of a release opening (30) formed in the second end element (11), the first end element (10) being then free to slide in translation on the axis of displacement (X) with respect to the second end element (11).

2. The emergency opening device as claimed in claim 1, wherein the cylindrical retractable rotary stop (20) is mounted to rotate about the axis of displacement (X).

3. The emergency opening device as claimed in claim 1, wherein the cylindrical retractable rotary stop (20) is mounted to slip along the axis of displacement (X).

4. The emergency opening device as claimed in claim 1, wherein the release opening (30) of the second end element (11) has a section fitted to the section of the cylindrical retractable rotary stop (20).

5. The emergency opening device as claimed in claim 1, wherein the cylindrical retractable rotary stop (20) is formed by a sleeve having an inner surface having a shape of a cylinder and an outer surface having at least one flat surface (21), the sleeve being mounted by a pivot link sliding over a portion of the first end element (10) having an outer surface having a shape of a cylinder, the driving surface (26) being composed of an edge of the sleeve.

6. The emergency opening device as claimed in claim 5, wherein the release opening (30) of the second end element (11) comprises at least one flat surface (31) on its inner surface (29), the flat surface (21) of the cylindrical retractable rotary stop (20) being in line with the flat surface (31) of the second end element (11) when the cylindrical retractable rotary stop (20) is in the release position.

7. The emergency opening device as claimed in claim 1, wherein the release opening (30) of the second end element (11) comprises, on an inner surface (29) and a guiding portion for the first end element (10).

8. The emergency opening device as claimed in claim 1, further comprising a rotation stop ring (24) fixed onto the first end element (10), the cylindrical retractable rotary stop (20) and the rotation stop ring (24) being able to be secured in rotation by teeth (28) inserted into notches (27).

9. The emergency opening device as claimed in claim 8, wherein the first end element (10) comprises a spring (23) biasing the cylindrical retractable rotary stop (20) against the rotation stop ring (24).

10. The emergency opening device as claimed in claim 9, wherein the spring (23) is housed in a groove (34) on the cylindrical retractable stop (20).

11. The emergency opening device as claimed in claim 1, wherein the first end element (10) comprises a stop surface (25) for stopping the translation on the axis of displacement (X) of the cylindrical retractable rotary stop (20), the stop surface (25) being disposed in line with the cylindrical retractable rotary stop (20), opposite the driving surface (26).

12. The emergency opening device as claimed in claim 1, wherein the second end element (11) comprises a bearing flange (19) for the elastic compression device (3), the flange (19) being disposed around the release opening (30) of the second end element (11).

13. The emergency opening device as claimed in claim 1, further comprising a sliding cylinder (9) coaxial with the axis of displacement (X), the first end element (10) and the second end element (11) being mounted to slide on the sliding cylinder (9).

14. The emergency opening device as claimed in claim 13, wherein the sliding cylinder (9) comprises a travel end stop (33) for the operating member (2).

\* \* \* \* \*